US012580238B2

(12) United States Patent
Jung et al.

(10) Patent No.: US 12,580,238 B2
(45) Date of Patent: Mar. 17, 2026

(54) BATTERY MODULE IN WHICH CONNECTION BETWEEN ELECTRODE LEAD AND VOLTAGE SENSING MEMBER IS SIMPLIFIED, AND BATTERY PACK INCLUDING THE SAME

(71) Applicant: LG Energy Solution, Ltd., Seoul (KR)

(72) Inventors: Ki-Taek Jung, Daejeon (KR); Jun-Kyu Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 860 days.

(21) Appl. No.: 17/776,888

(22) PCT Filed: Jul. 9, 2021

(86) PCT No.: PCT/KR2021/008843
§ 371 (c)(1),
(2) Date: May 13, 2022

(87) PCT Pub. No.: WO2022/019550
PCT Pub. Date: Jan. 27, 2022

(65) Prior Publication Data
US 2022/0407131 A1 Dec. 22, 2022

(30) Foreign Application Priority Data
Jul. 22, 2020 (KR) ........................ 10-2020-0091074

(51) Int. Cl.
*H01M 10/48* (2006.01)
*H01M 50/502* (2021.01)
(52) U.S. Cl.
CPC ....... *H01M 10/482* (2013.01); *H01M 50/502* (2021.01); *H01M 2220/20* (2013.01)

(58) Field of Classification Search
CPC ............. H01M 10/482; H01M 50/502; H01M 2220/20; H01M 50/284; H01M 50/507;
(Continued)

(56) References Cited

U.S. PATENT DOCUMENTS

2014/0154602 A1* 6/2014 Michelitsch ........ H01M 8/0258
429/432
2014/0302360 A1* 10/2014 Klammler ........... H01M 50/514
429/72
(Continued)

FOREIGN PATENT DOCUMENTS

CN 103891004 A 6/2014
CN 107112482 A 8/2017
(Continued)

OTHER PUBLICATIONS

Extended European Search Report including Written Opinion for Application No. 21845218.3 dated Jul. 3, 2024. 8 pgs.
(Continued)

*Primary Examiner* — Matthew T Martin
*Assistant Examiner* — Bartholomew A Hornsby
(74) *Attorney, Agent, or Firm* — Lerner David LLP

(57) ABSTRACT

A battery module includes: a cell stack having battery cells stacked in one direction and at least one lead overlapping portion formed as electrode leads of the battery cells overlap each other; and a voltage sensing member having at least one sensing part directly connected to the at least one lead overlapping portion, wherein each lead overlapping portion and each sensing part are directly combined by clinching.

12 Claims, 10 Drawing Sheets

(58) Field of Classification Search
CPC .. H01M 50/569; H01M 50/211; H01M 10/48;
H01M 10/42; H01M 10/425; H01M
50/20; H01M 50/50; Y02E 60/10; Y02T
10/70
See application file for complete search history.

(56) References Cited

U.S. PATENT DOCUMENTS

| | | | |
|---|---|---|---|
| 2016/0126524 A1 | 5/2016 | Sasaki | |
| 2017/0104247 A1 | 4/2017 | Son | |
| 2017/0352851 A1* | 12/2017 | Kuboki | H01M 50/583 |
| 2018/0159096 A1 | 6/2018 | Kim et al. | |
| 2018/0315976 A1* | 11/2018 | Lee | H01M 50/211 |
| 2020/0083557 A1 | 3/2020 | Gerlach et al. | |
| 2020/0203700 A1 | 6/2020 | Park et al. | |
| 2021/0184379 A1 | 6/2021 | Jung | |
| 2021/0194098 A1 | 6/2021 | Lee et al. | |
| 2021/0194101 A1 | 6/2021 | Kim et al. | |
| 2021/0313657 A1 | 10/2021 | Park et al. | |
| 2022/0407196 A1 | 12/2022 | Jung et al. | |

FOREIGN PATENT DOCUMENTS

| | | | | | |
|---|---|---|---|---|---|
| CN | 107710450 A | 2/2018 | | | |
| CN | 210272520 U | 4/2020 | | | |
| JP | 2006244755 A | 9/2006 | | | |
| JP | 2007-242376 A | 9/2007 | | | |
| JP | 2014-093218 A | 5/2014 | | | |
| JP | 2014-524107 A | 9/2014 | | | |
| JP | 6750097 B2 | 7/2015 | | | |
| JP | 2016-092005 A | 5/2016 | | | |
| JP | 2016081875 A | 5/2016 | | | |
| JP | 2017-004646 A | 1/2017 | | | |
| JP | 2018-530107 A | 10/2018 | | | |
| JP | 2021-511619 A | 5/2021 | | | |
| JP | 2021-523532 A | 9/2021 | | | |
| JP | 2023-501827 A | 1/2023 | | | |
| KR | 20140076624 A | 6/2014 | | | |
| KR | 20150062777 A | 6/2015 | | | |
| KR | 20160094909 A | 8/2016 | | | |
| KR | 20170017132 A | * | 2/2017 | | G01R 31/3606 |
| KR | 20170042066 A | 4/2017 | | | |
| KR | 20180036404 A | 4/2018 | | | |
| KR | 20190061378 A | * | 6/2019 | | H01M 10/486 |
| KR | 20190084765 A | 7/2019 | | | |
| KR | 20190124022 A | 11/2019 | | | |
| KR | 20200040619 A | 4/2020 | | | |
| KR | 20200071614 A | 6/2020 | | | |

OTHER PUBLICATIONS

International Search Report for Application No. PCT/KR2021/008843 mailed Oct. 26, 2021, 2 pages.

* cited by examiner

BATTERY MODULE IN WHICH CONNECTION BETWEEN ELECTRODE LEAD AND VOLTAGE SENSING MEMBER IS SIMPLIFIED, AND BATTERY PACK INCLUDING THE SAME

CROSS REFERENCE TO RELATED APPLICATIONS

This application is a national phase entry under 35 U.S.C. § 371 of International Application No. PCT/KR2021/008843, filed on Jul. 9, 2021, which claims priority to Korean Patent Application No. 10-2020-0091074 filed on Jul. 22, 2020 in the Republic of Korea, the disclosures of which are incorporated herein by reference.

TECHNICAL FIELD

The present disclosure relates to a battery module, and more particularly, to a battery module in which a connection structure between a voltage sensing member and electrode leads of battery cells is improved for voltage sensing of the battery cells in the battery module, and a battery pack including the battery module.

BACKGROUND ART

Semi-permanent batteries, which convert electric energy into a form of chemical energy and are capable of being repeatedly charged and discharged, are referred to as secondary batteries to be distinguished from primary batteries that are unable to be reused after being used once.

The secondary batteries include a lithium secondary battery, a nickel cadmium (Ni—Cd) battery, a lead storage battery, a nickel metal hydride (Ni-MH) battery, a zinc-air battery, an alkaline manganese battery, and the like. Thereamong, the lead storage battery and the lithium secondary battery are most actively commercialized secondary batteries.

In particular, the lithium secondary battery has recently been actively used as an electric vehicle battery, due to advantages, such as high energy storage density, potential for weight-lightening and miniaturization, excellent stability, low discharge rate, and long-life. For reference, the lithium secondary battery is generally classified into a cylindrical type, an angular type, and a pouch type depending on the manufacturing, and a purpose of use thereof spans an electronic switching system (ESS) battery, another electric device, and the like, in addition to the electric vehicle battery.

Currently, one lithium secondary battery (cell) is unable to obtain an output sufficient enough to drive an electric vehicle. To apply a secondary battery as an energy source of an electric vehicle, a battery module in which a plurality of lithium ion battery cells are connected in series and/or in parallel needs to be configured, and generally, a battery pack including a battery management system (BMS), a cooling system, a battery disconnection unit (BDU), electric wiring cables, and the like, which connect the battery modules in series and functionally maintain the same, is configured.

As shown in FIG. 1, when a battery module is configured with a pouch type secondary battery cell, electrode leads 1a and 1b of the pouch type secondary battery cell are welded to a bus bar 3 via a laser. The bus bar 3 is located at a front portion or at the front portion and a rear portion of the battery module, and the plurality of electrode leads 1a and 1b are welded per one bus bar 3, and thus the secondary battery cells are connected in series and in parallel.

Voltage information of the secondary battery cells in the battery module is transmitted to a BMS via a sensing member 5 connected to each bus bar 3, and the BMS controls charging and discharging of the secondary battery cells by monitoring a state of each secondary battery cell, based on the voltage information.

A harness wire, a flat flexible cable (FFC), a flexible printed circuit board (FPCB), or the like is used as the sensing member 5, and in the prior art, the sensing member 5 and the bus bar 3 are electrically connected by compressing a welding terminal 6 to an end portion of the sensing member 5 and welding the sensing member 5 to the bus bar 3 via a laser.

However, a method of indirectly connecting the electrode leads 1a and 1b and the sensing member 5 via the bus bar 3 as a medium as described above is costly in terms of expenses, and it is not easy to manage quality of laser welding.

DISCLOSURE

Technical Problem

The present disclosure is designed to solve the problems of the prior art, and therefore the present disclosure is directed to simplifying an assembling process of a battery module by directly connecting electrode leads of battery cells to corresponding sensing parts of a voltage sensing member, without using a bus bar.

The technical problems to be solved in the present disclosure are not limited to the above, and other problems that are not mentioned could be clearly understood by one of ordinary skill in the art from the description of the present disclosure below.

Technical Solution

In one aspect of the present disclosure, there is provided a battery module including: a cell stack having battery cells stacked in one direction and at least one lead overlapping portion formed as electrode leads of the battery cells overlap each other; and a voltage sensing member having at least one sensing part directly connected to the at least one lead overlapping portion, wherein each lead overlapping portion and each sensing part are combined with each other by clinching.

The battery module may further include a support frame having slits formed every predetermined interval along a stack direction of the battery cells, the support frame being disposed at a front portion or rear portion of the cell stack, wherein each lead overlapping portion may be extracted to a front portion of the support frame through each of the slits and arranged to face a surface of the support frame.

The support frame may have a clinching groove, and a region of the lead overlapping portion and the sensing part overlapping each other may be press-fitted into the clinching groove.

The clinching groove may include: an edge region concavely formed; and a center region convexly formed relative to the edge region.

An electrode lead arranged to directly contact the support frame from among the electrode leads forming the lead overlapping portion may include a hole formed to be less than an inner diameter of the clinching groove.

The battery module may include a lead holding member having a first holding bar adhered to the front portion of the support frame so that a connection portion of the lead overlapping portion and the at least one sensing part is provided between the first holding bar and the support frame, the lead holding member being detachably provided at the support frame.

The lead holding member may include: a shaft combined to a lower portion of the support frame via a hinge and connected to the first holding bar; and a second holding bar connected to the shaft and extending in parallel from a location spaced apart from the first holding bar by a predetermined interval.

The support frame may include at least one latch provided to be combined and locked to the first holding bar.

The voltage sensing member may include: a first main body portion extending in a longitudinal direction of the cell stack at a top portion of the cell stack; and a second main body portion extending in a width direction of the cell stack from both end portions of the first main body portion, wherein each of the at least one sensing part may extend from the second main body portion to contact each of the at least one lead overlapping portion.

The voltage sensing member may be formed of a flat flexible cable (FFC) or a flexible printed circuit board (FPCB).

In another aspect of the present disclosure, there is provided a battery pack including the battery module.

In another aspect of the present disclosure, there is provided a vehicle including the battery pack.

Advantageous Effects

A battery module according to the present disclosure may have a simplified assembly structure as electrode leads of battery cells and corresponding sensing parts of a voltage sensing member can be directly connected and fixed by clinching, without using a bus bar.

Also, according to the present disclosure, manufacturing costs can be reduced by clinching an electrode lead and a voltage sensing member without a bus bar, compared to a connection method between an electrode lead, a bus bar, and a voltage sensing member according to a laser welding method of the prior art.

The effects of the present disclosure are not limited to the above, and effects that are not mentioned could be clearly understood by one of ordinary skill in the art from the present specification and accompanying drawings.

DESCRIPTION OF DRAWINGS

FIG. 3 is a view showing a front portion of a battery module, according to an embodiment of the present disclosure.

MODE FOR DISCLOSURE

Figure 1:
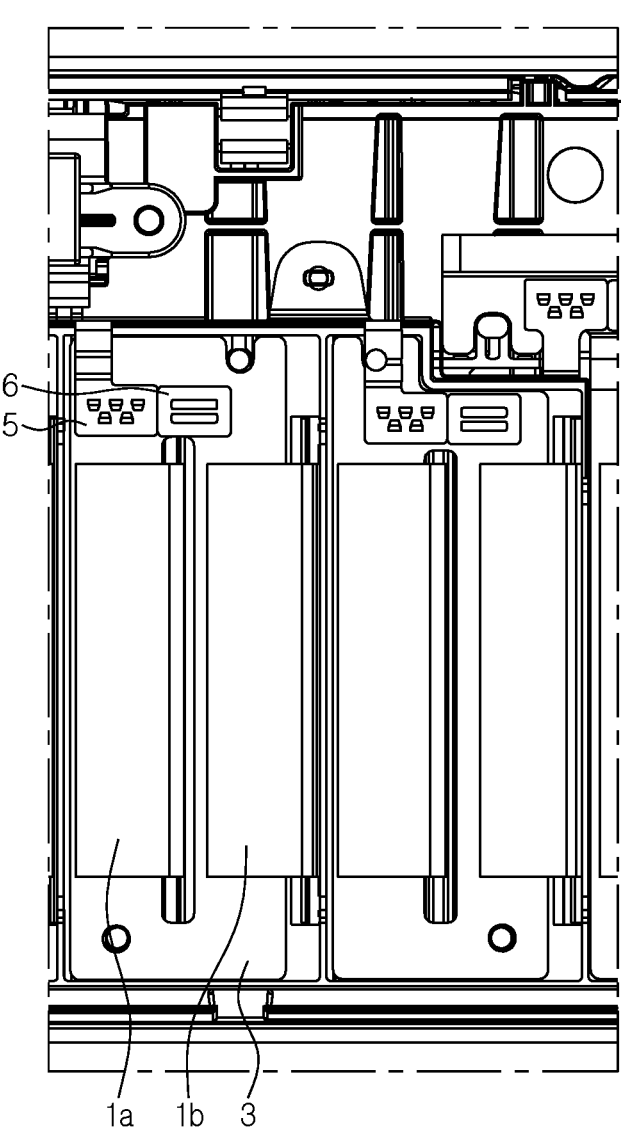
FIG. 1 is a view showing a portion of a battery module according to the prior art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Embodiments of the present disclosure are provided to further fully describe the present disclosure to one of ordinary skill in the art, and thus shapes and sizes of elements in the drawing may be exaggerated, omitted, or schematically shown for a clearer description. Thus, the size or scale of each element does not entirely reflect the actual size or scale.

Figure 2:
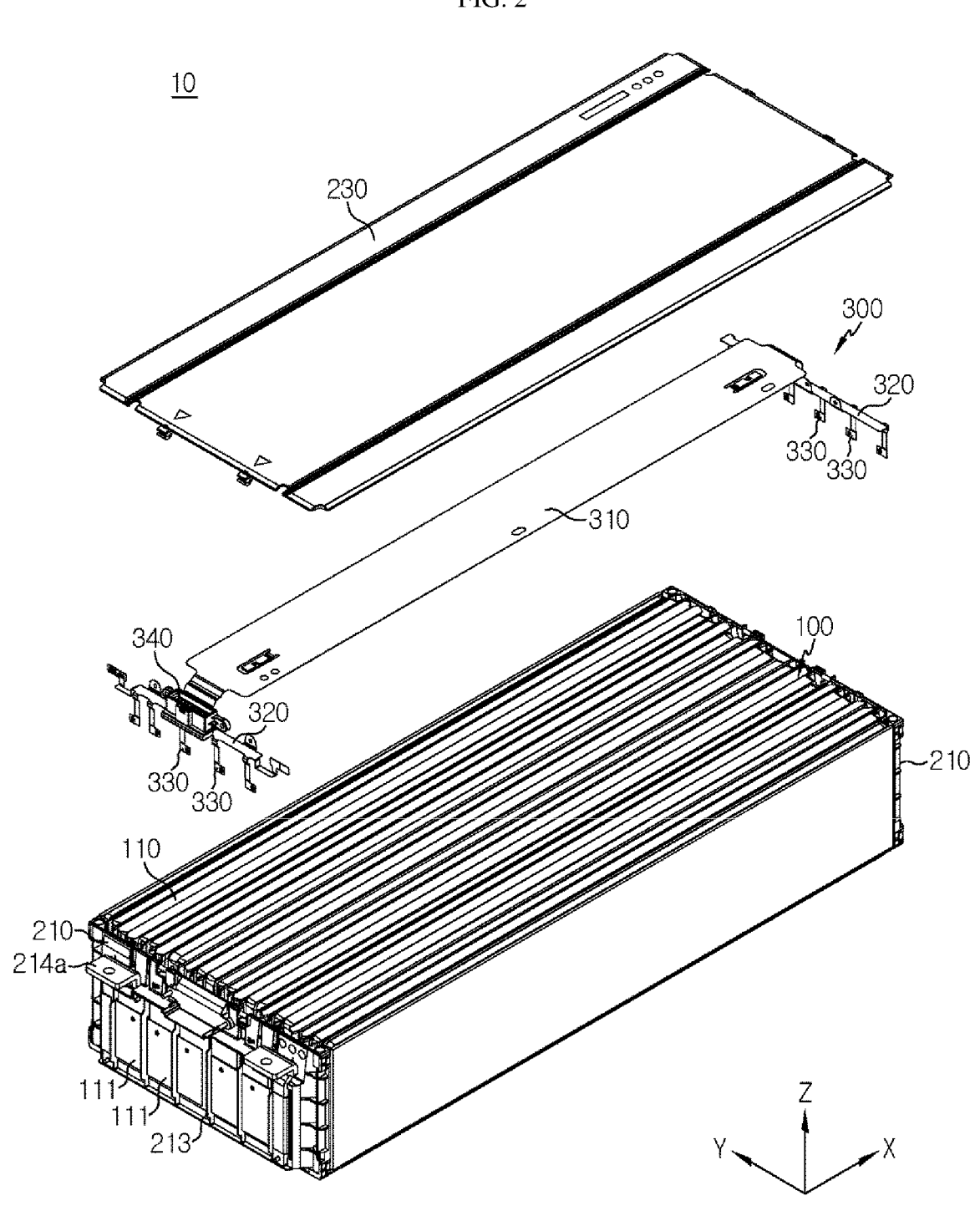
FIG. 2 is a partial exploded perspective view of a battery module according to an embodiment of the present disclosure.
Figure 3:
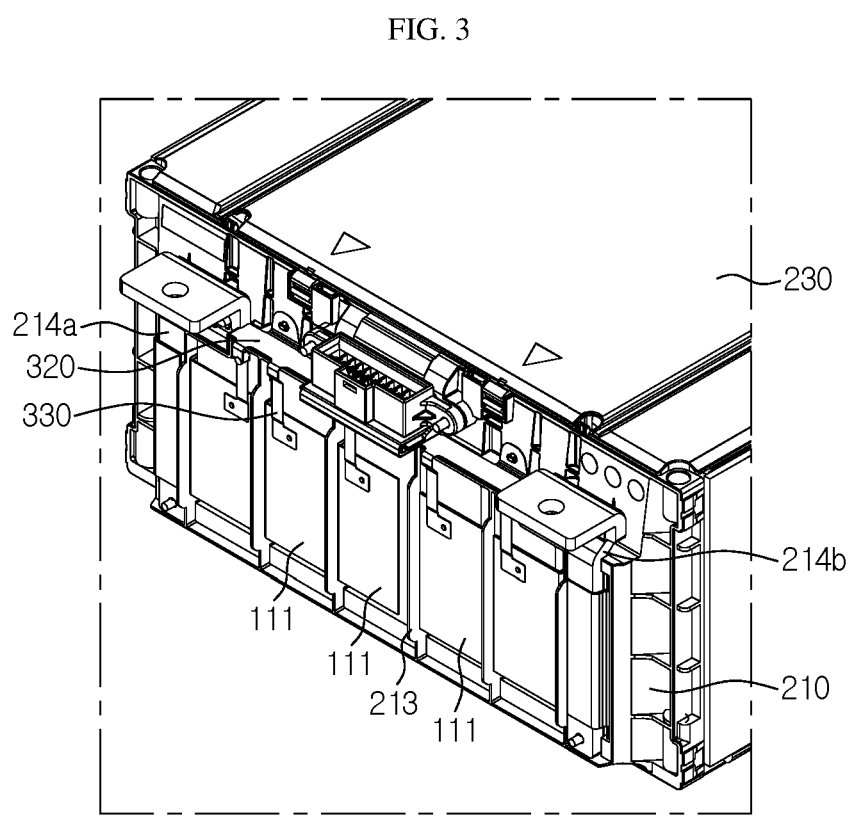
Figure 4:
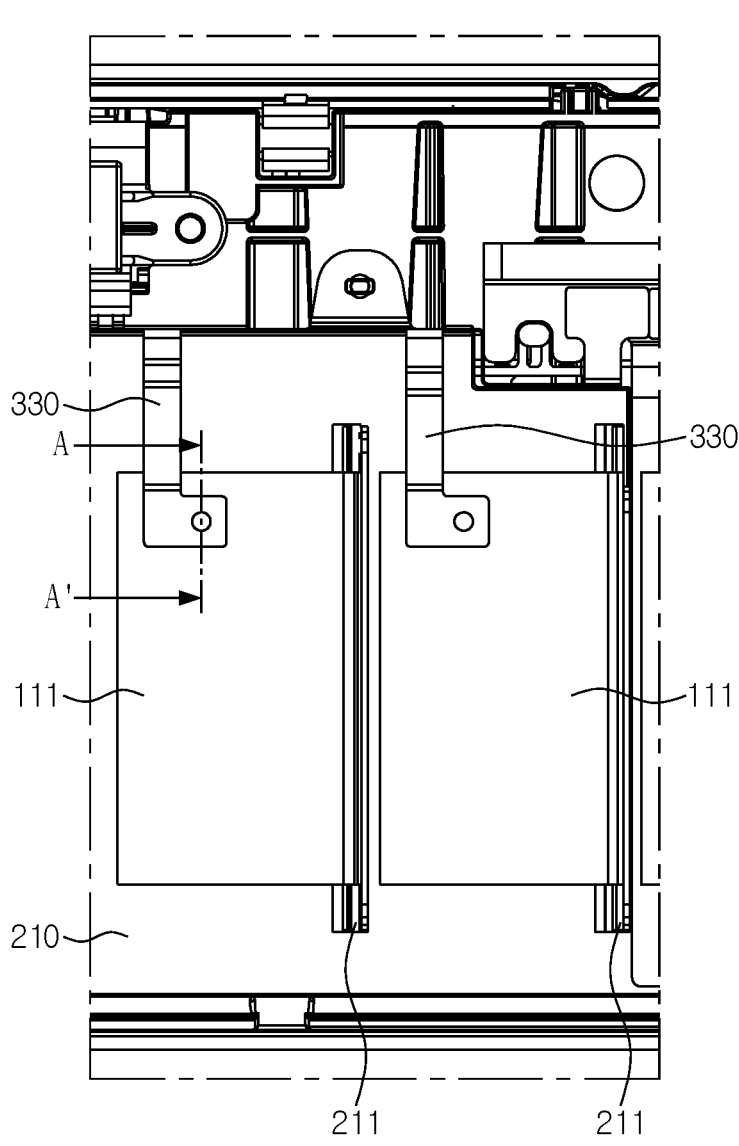
FIG. 4 is a partial enlarged view of FIG. 3.

FIG. 2 is a partial exploded perspective view of a battery module according to an embodiment of the present disclosure, FIG. 3 is a view showing a front portion of a battery module, according to an embodiment of the present disclosure, and FIG. 4 is a partial enlarged view of FIG. 3.

Referring to FIGS. 2 through 4, a battery module 10 according to an embodiment of the present disclosure may include a cell stack 100, a support frame 210, and a voltage sensing member 300.

The cell stack 100 is an assembly including battery cells 110. The battery cells 110 are each oriented in an up-and-down direction (±Z) and stacked in a right-and-left direction (±Y) to form one cell stack 100.

A buffer pad, a cooling pin, or the like may be further added between the battery cells 110. The buffer pad or the cooling pin may perform a function for absorbing a shock or efficiently emitting heat of each battery cell 110 to the outside.

A pouch type battery cell or an angular type battery cell may be applied as the battery cell 110, and in the present embodiment, the pouch type battery cell 110 is applied.

Although not illustrated in detail, the pouch type battery cell 110 may include an electrode assembly, an electrolyte, and a pouch exterior material for sealing and accommodating the electrode assembly and the electrolyte.

The electrode assembly may have a stack structure of a positive electrode plate/separation film/negative electrode plate, the positive electrode plate and the negative electrode plate including electrode tabs, and at least one electrode tab is connected to an electrode lead. The electrode lead extends from the inside to the outside of the pouch exterior material to function as an electrode terminal of the battery cell 110.

Here, the electrode lead collectively refers to a positive electrode lead 111a and a negative electrode lead 111b.

The pouch exterior material protects internal elements, such as the electrode assembly, the electrolyte, and the like, and may be configured in a form including a metal thin film, for example, an aluminum thin film, to supplement an electrochemical property by the electrode assembly and the electrolyte and enhance heat dissipation or the like. The aluminum thin film may be disposed between an internal adhesive layer and an insulation layer formed of an insulating material, so as to secure electric insulation.

In particular, in the battery module 10 according to the present disclosure, the electrode leads 111a and 111b of the adjacent battery cells 110 overlap each other in a predetermined pattern and thus the battery cells 110 are connected in series or in series and parallel.

For example, when it is assumed that any one battery cell 110 is an Nth cell, the following battery cells 110 are sequentially an N+1st cell, an N+2nd cell, and so on, and each battery cell 110 is arranged to face the adjacent battery cell 110 such that polarities are in opposite directions, along a stack direction (±Y-axis), the positive electrode lead 111a of the Nth cell and the negative electrode lead 111b of the N+1st cell are stacked at a front portion of the cell stack 100. Conversely, the positive electrode lead 111a of the N+1st cell and the negative electrode lead 111b of the N+2nd cell are stacked at a rear portion of the cell stack 100. The electrode leads of the battery cells 110 are stacked in such a pattern and are fixed with a rivet member 400 described below to connect the battery cells 110 in series.

As another example, by forming two to three consecutive battery cells 110 as one group, same groups may be arranged such that polarities face a same direction and positive electrode leads 111a of one group and negative electrode leads 111b of another group may be stacked and integrally clinched, thereby connecting the battery cells 110 in series and in parallel.

A configuration in which the electrode leads are stacked to connect the battery cells 110 in series or in series and parallel as such is hereinafter referred to as a lead overlapping portion 111.

The support frame 210 is a unit for supporting the cell stack 100, and may be provided at each of the front portion and the rear portion of the cell stack 100.

The support frame 210 includes slits 211 formed every predetermined interval along the stack direction (±Y) of the battery cells 110. The lead overlapping portion 111 of the cell stack 100 may be extracted to a front portion of the support frame 210 through the slits 211. The lead overlapping portion 111 that passed through the slits 211 may be bent to face a surface of the support frame 210. An isolation plate 213 for preventing a short by an arbitrary metal object may be provided between the bent lead overlapping portions 111.

A top plate frame 230 may be disposed at a top portion of the support frame 210. The top plate frame 230 is a configuration for covering a top end portion of the cell stack 100, and both end portions thereof may be provided to be combined to top end portions of two support frames 210 via hinges.

The voltage sensing member 300 is an element operating to sense a node voltage of the battery cells 110 connected in series, and transmit voltage information of each battery cell 110 to a battery management system (BMS) (not shown). The BMS monitors states of the battery cells 110 via the voltage sensing member 300 and controls charging and discharging of the battery cells 110.

The voltage sensing member 300 may be implemented by a film cable, such as a flexible printed circuit board (FPCB) or a flat flexible cable (FFC).

The FPCB may be manufactured by arranging a copper foil stack plate on a base film, laminating a dry film, performing exposure, development, and etching processes to form conductor lines having regular intervals, and then adhering a coverlay film. Also, the FFC may be manufactured by arranging conductor lines on a base film at regular intervals, and then laminating a coverlay thereon.

The voltage sensing member 300 having such a film cable form has excellent conduction performance of conductor lines and secures insulation between the conductor lines by using one insulation film, and thus a large number of signals may be processed with minimum volume.

Referring to FIG. 2, the voltage sensing member 300 according to the present disclosure is manufactured in a form of a FPCB, and includes a first main body portion 310 extending in a longitudinal direction (±X-axis) of the cell stack 100 at a top portion of the cell stack 100, a second main body portion 320 extending in a width direction (±Y-axis) of the cell stack 100 from both end portions of the first main body portion 310, and sensing parts 330 extending at locations corresponding to the lead overlapping portions 111 of the cell stack 100, respectively, from the second main body portion 320. A connector 340 may be mounted on one side of the second main body portion 320, and a signal may be transmitted or received to or from the connector 340 by accessing another cable connector (not shown) connected to the BMS.

For reference, the voltage sensing member 300 being disposed at the top portion of the cell stack 100 is for wire distance reduction and installation convenience. When required, the voltage sensing member 300 may be disposed at a location other than the top portion of the cell stack 100.

Hereinafter, an electric connection structure between each sensing part 330 of the voltage sensing member 300 and each lead overlapping portion 111 of the cell stack 100, and a method thereof will be described.

As shown in FIG. 3, a positive electrode terminal 214a and a negative electrode terminal 214b of the battery module 10 may be respectively disposed at a left end portion and a right end portion of the support frame 210, and may be provided in forms of metal bars having top end portions bent externally and horizontally. At the positive electrode terminal 214a, a positive electrode lead of the outermost battery cell 110 at one side in the cell stack 100 may be attached, and at the negative electrode terminal 214b, a negative electrode lead of the outermost battery cell 110 at the other side may be attached.

The electrode leads and sensing parts 330 of the battery cells 110 excluding the electrode leads and sensing parts 330 respectively attached to the positive electrode terminal 214a and negative electrode terminal 214b may be connected directly without a bus bar.

As shown in FIG. 4, each sensing part 330 extends in a downward direction from the second main body portion 320 and is disposed on a front surface of each lead overlapping portion 111, and an end portion of each sensing part 330 is configured such that one surface of an insulation film 331 is removed and a sensing terminal 333 is exposed. Such an end portion of the sensing part 330 is combined to the lead overlapping portion 111 by clinching, and thus conduction is achieved.

Figure 5:
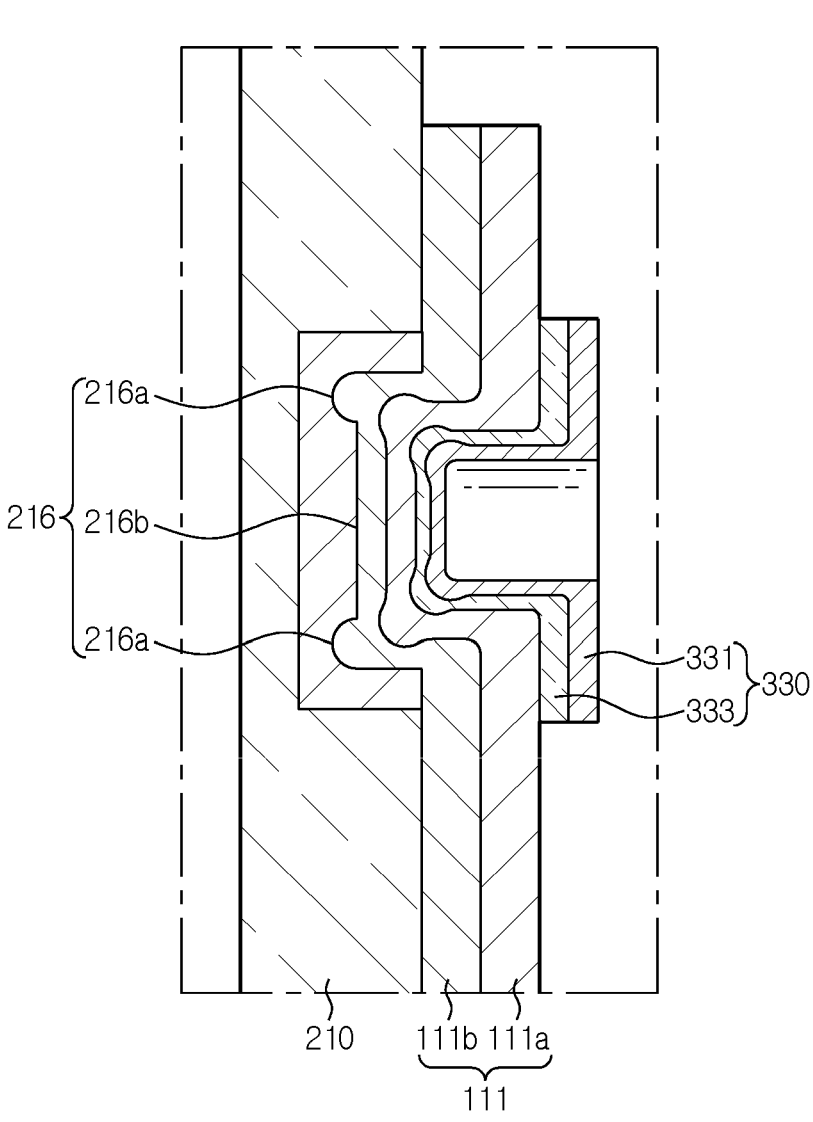
FIG. 5 is a cross-sectional view taken along a line A-A' of FIG. 4.

In other words, the end portion of the sensing part 330 and the lead overlapping portion 111 may be clinched on the support frame 210 while overlapping each other. For reference, it is possible to clinch and combine only the sensing part 330 and the lead overlapping portion 111 by using a clinching device including a die (not shown) and a punch P. However, in this case, the sensing part 330 and the lead overlapping portion 111 may move while being combined, due to an external impact or vibration. In this regard, the present embodiment is configured such that the combining and fixing of the sensing part 330 and lead overlapping portion 111 are simultaneously achieved by pressing the end portion of the sensing part 330 and lead overlapping portion 111 on the support frame 210, as shown in FIG. 5.

In particular, in the present embodiment, a clinching groove 216 is further provided in the support frame 210 so as to integrally press the sensing part 330 and the lead overlapping portion 111 to the support frame 210. The clinching groove 216 operates as a die supporting the lead overlapping portion 111 and the sensing part 330 during a clinching process.

Such a clinching groove 216 may include an edge region 216a concavely formed, and a center region 216b convexly formed relative to the edge region 216a.

As will be described below, the clinching groove 216 may be manufactured with a metal, such as stainless steel, to sufficiently endure a pressurizing force of the punch P, and combined into the support frame 210 via insert injection molding.

A clinching method of the sensing part 330 and the lead overlapping portion 111, according to the present embodiment, will be briefly described below.

Figure 6:
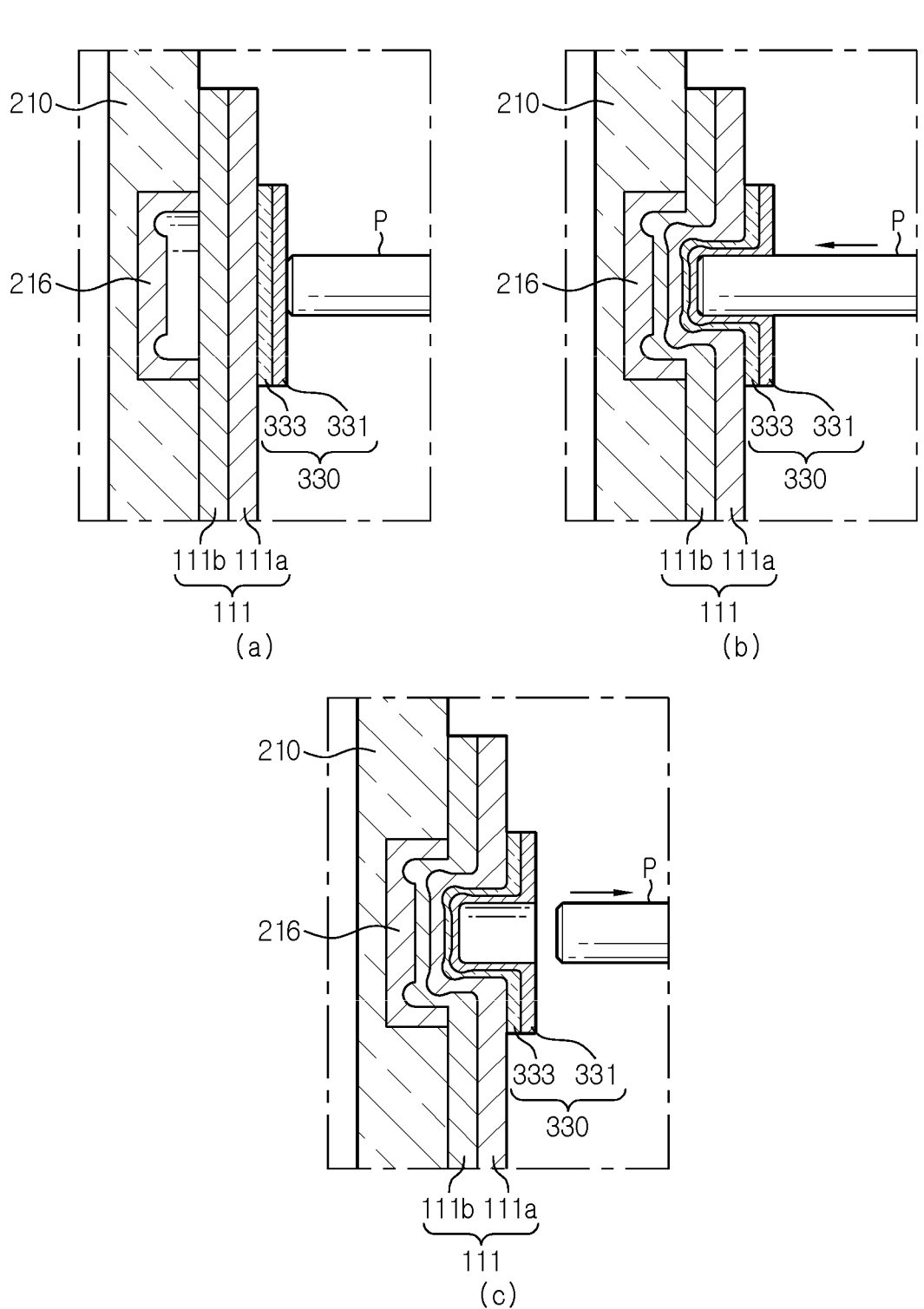
FIG. 6 illustrates a clinching process view of a lead overlapping portion and a sensing part, according to an embodiment of the present disclosure.

First, as shown in (a) of FIG. 6, one surface of the lead overlapping portion 111 is arranged to face the clinching groove 216 of the support frame 210, and one surface of the sensing part 330 is arranged to face another surface of the lead overlapping portion 111.

Then, as shown in (b) of FIG. 6, the sensing part 330 and lead overlapping portion 111 are pressurized with respect to the clinching groove 216 by using the punch P. A pressurized region moves into the clinching groove 216 and thus modification occurs according to an internal shape of the clinching groove 216. Here, thicknesses of the sensing part 330 and lead overlapping portion 111 outside the clinching groove 216 are not largely changed, but regions thereof disposed inside the clinching groove 216 are compressed and are changed in thickness, and thus the sensing part 330 and the lead overlapping portion 111 may be combined with each other.

A maximum value of a pressurizing force of the punch P may be pre-set according to a material or thickness of a parent material to be combined, and when the pressurizing force of the punch P reaches the maximum value, the punch P is returned to an original location as shown in (c) of FIG. 6.

Accordingly, the lead overlapping portion 111 and the sensing part 330 may be strongly pressed-fitted and fixed inside the clinching groove 216 while overlapping each other. Although not illustrated, another portion of the lead overlapping portion 111 may be additionally fixed to the support frame 210 via the above method.

Figure 7:
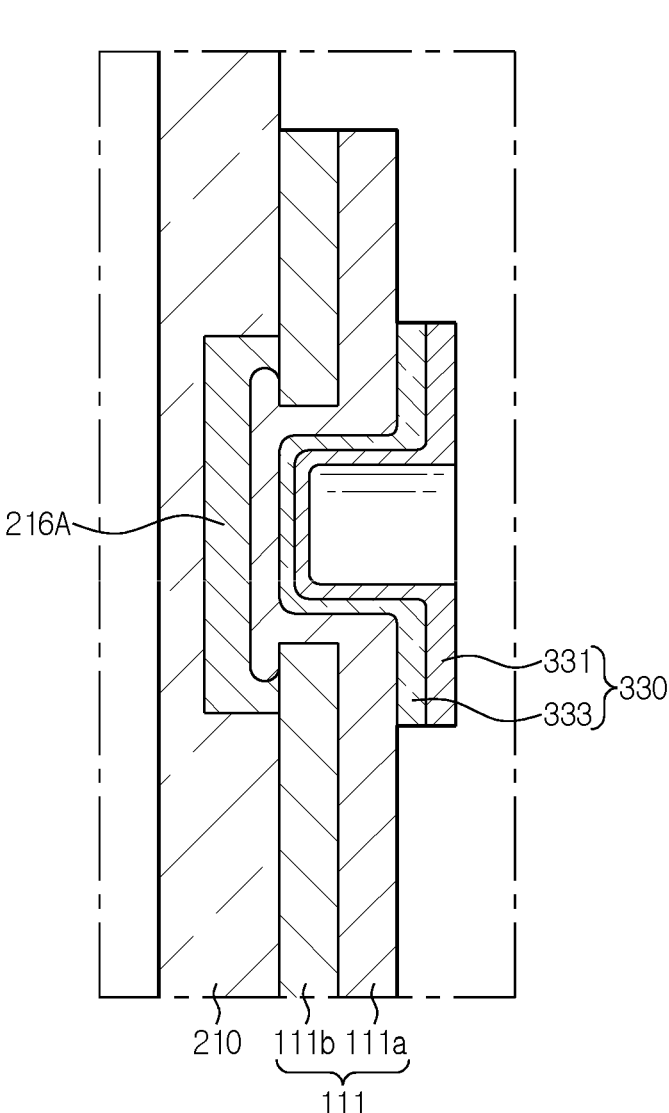
FIG. 7 is a view corresponding to FIG. 5 and showing a modified example of a combined structure of a lead overlapping portion and a sensing part.
Figure 8:
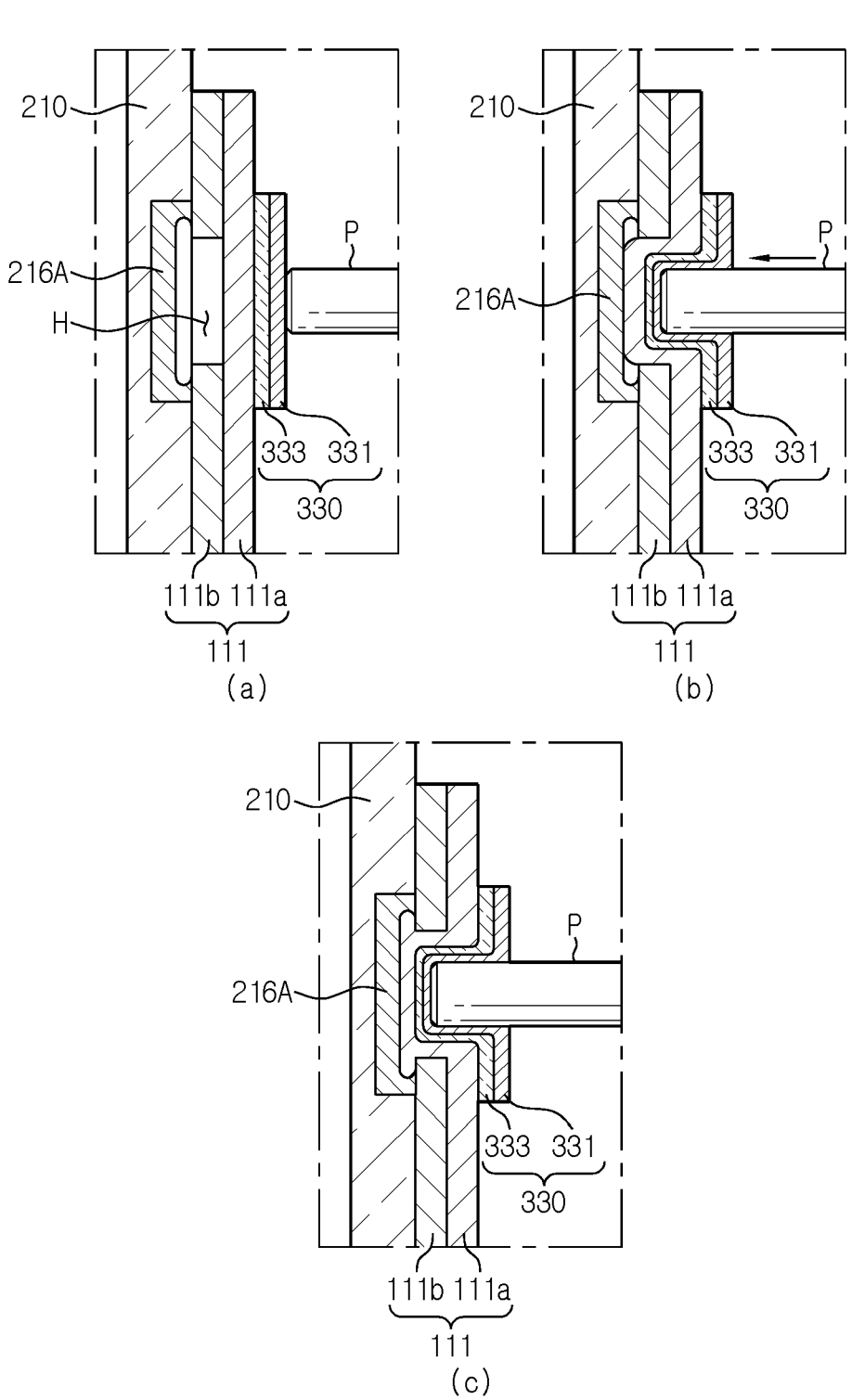
FIG. 8 is a clinching process view of the lead overlapping portion and the sensing part of FIG. 7.

FIG. 7 is a view corresponding to FIG. 5 and showing a modified example of a combined structure of a lead overlapping portion and a sensing part, and FIG. 8 is a clinching process view of the lead overlapping portion and the sensing part of FIG. 7.

In the lead overlapping portion 111 according to the modified example, a hole H formed to be less than an inner diameter of a clinching groove 216A is provided in an electrode lead arranged to directly contact the support frame 210 from among electrode leads.

For example, referring to FIGS. 7 and 8, compared to the embodiment of FIG. 5, the modified example has the hole H formed in the negative electrode lead 111b and has a combined structure in which a portion of the positive electrode lead 111a is disposed between the negative electrode lead 111b and the clinching groove 216 via the hole H.

According to such a modified example, the positive electrode lead 111a may be adhered on both surfaces of the negative electrode lead 111b, and an adhesive force between the positive electrode lead 111a and the sensing part 330 may be further increased. Thus, compared to the above-described embodiment, the modified example may have more combining strength of the lead overlapping portion 111 and the sensing part 330.

As described above, a method of directly combining the lead overlapping portion 111 and the sensing part 330 by clinching without heat and a spark is eco-friendly, and in particular, has excellent cost efficiency compared to a method of the prior art of indirectly connecting the sensing part and an electrode lead by performing laser welding using a bus bar as a medium.

Also, generally, the positive electrode lead 111a is manufactured by aluminum (Al) and the negative electrode lead 111b is manufactured by copper (Cu), and when dissimilar metals are welded and combined, combining strength may be low. However, the clinching combining method is not greatly hindered by a type of a metal, and thus is more advantageous in combining the dissimilar metals compared to the welding method.

Also, a combining range of a parent material is wide in the clinching combining method, and thus, unlike the present embodiment, it is possible to configure the lead overlapping portion 111 by stacking two or at least three positive electrode leads 111a and negative electrode leads 111b and clinching the lead overlapping portion 111 and sensing part 330.

Figure 9:
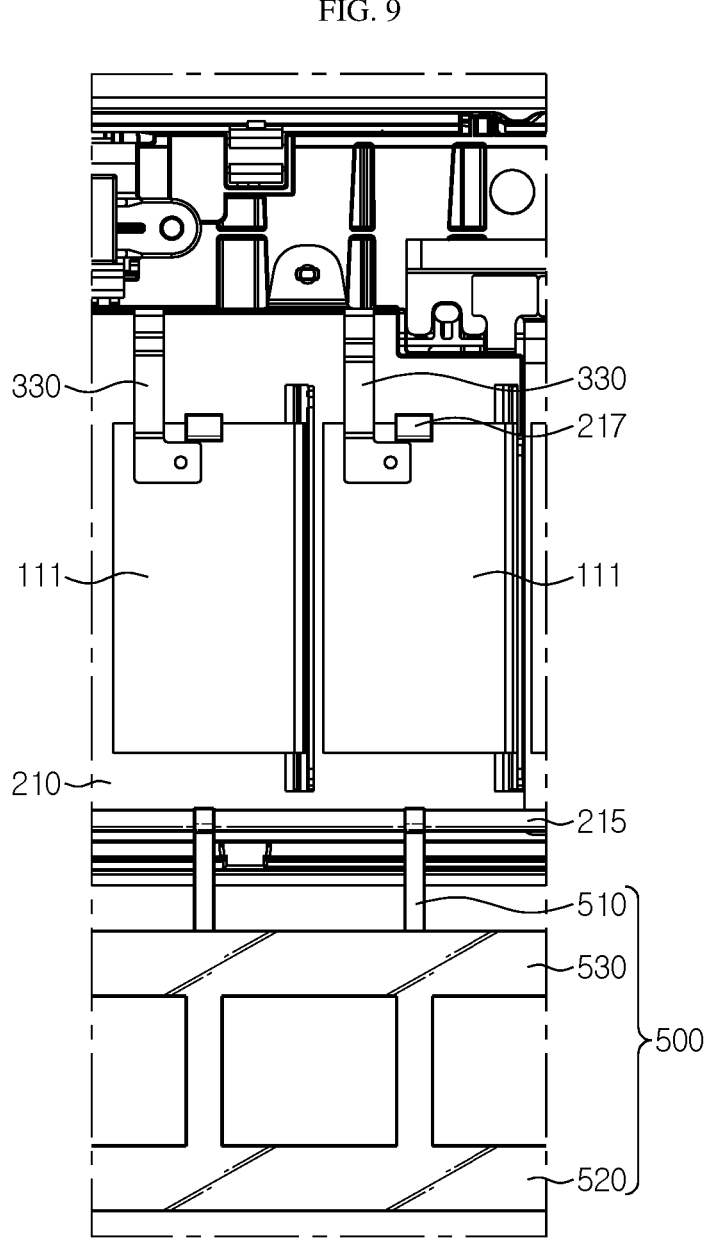
FIG. 9 is a view corresponding to FIG. 4 and showing a configuration of a lead holding member of a battery module according to another embodiment of the present disclosure.
Figure 10:
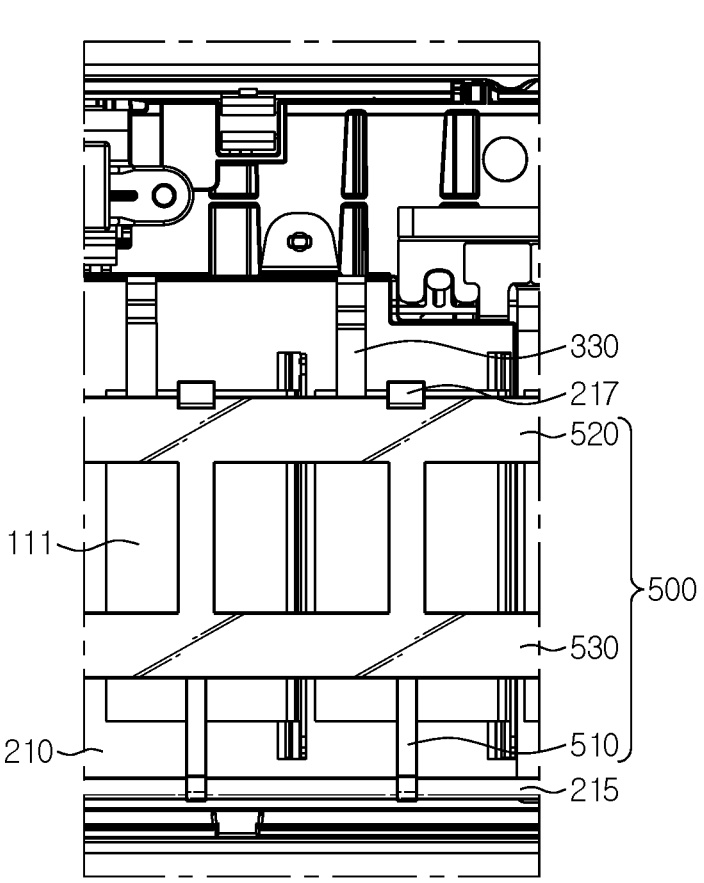
FIG. 10 is a view showing a state in which the lead holding member of FIG. 9 is adhered to a support frame.

FIG. 9 is a view corresponding to FIG. 4 and showing a configuration of a lead holding member of a battery module according to another embodiment of the present disclosure, and FIG. 10 is a view showing a state in which the lead holding member of FIG. 9 is adhered to a support frame.

Next, a battery module according to another embodiment of the present disclosure will be described with reference to FIGS. 9 and 10.

Like reference numerals as the above embodiments denote like elements, and differences from the above embodiments will be mainly described while omitting redundant descriptions about the like elements.

The battery module according to another embodiment of the present disclosure further includes a lead holding member 500 compared to the battery module 10 of the above embodiments.

The lead holding member 500 is an element for preventing movement of the lead overlapping portion 111 and preventing short-circuit occurrence.

In detail, the lead holding member 500 includes a shaft 510, a first holding bar 520, and a second holding bar 530. Also, the support frame 210 may include a support rod 215 at a bottom end portion thereof, and at least one latch 217 at a location spaced apart from the support rod 215 by a predetermined interval in an upward direction, so as to attach and detach the lead holding member 500.

The shaft 510 of the lead holding member 500 has one end portion combined to the support rod 215 via a hinge to be rotatable. For example, the one end portion of the shaft 510 may be inserted into the support rod 215, in a ring shape of an arc form. There may be a plurality of the shafts 510.

The first holding bar 520 and second holding bar 530 may be connected to the shaft 510 while extending in a direction crossing the shaft 510, and lengths thereof may correspond to a left-to-right width of the cell stack 100.

The first holding bar 520 and second holding bar 530 may be connected to the shaft 510 at locations spaced apart from each other by a predetermined interval such as to pressurize different regions of the lead overlapping portion 111.

By using such a configuration, while in the state as shown in FIG. 9, the lead holding member 500 is rotated in an upward direction such that the lead holding member 500 is adhered to the front portion of the support frame 210, and the latch 217 of the support frame 210 is latched and locked to the first holding bar 520.

Here, the first holding bar 520 may be adhered to the front portion of the support frame 210 so that a connection portion of both the lead overlapping portion 111 and the sensing part 330 is provided between the first holding bar 520 and the support frame 210, and the second holding bar 530 may be adhered to the front portion of the support frame 210 so that a bottom portion of the lead overlapping portion 111 is provided between the second holding bar 530 and the support frame 210.

According to such a lead holding member 500, unlike the above embodiments, movement of the sensing part 330 and lead overlapping portion 111 may be prevented without having to press-fit and fix the sensing part 330 and the lead overlapping portion 111 into the support frame 210. In other words, it is possible to directly connect only the sensing part 330 and lead overlapping portion 111 by clinching, and adhere and fix the same to the front portion of the support frame 210 by using the lead holding member 500.

Also, in the above embodiments, the isolation plate 213 is provided to prepare for, for example, a short-circuit that unexpectedly occurs when an arbitrary metal object contacts between the neighboring lead overlapping portions 111 during an assembling process of the battery module, but in the present embodiment, the lead overlapping portions 111 are covered by the lead holding member 500, and thus the isolation plates 213 may be removed and the lead holding member 500 may perform a short-circuit preventing function.

As described above, the battery module 10 according to the present disclosure may have a simplified assembly structure compared to the battery module 10 of the prior art by omitting a bus bar that has been generally used in the prior art for electric connection and voltage sensing of the battery cells 110, and directly connecting and fixing the voltage sensing member 300 and the electrode leads of the battery cells 110 by clinching instead.

Also, compared to the battery module 10 of the prior art in which the electrode lead, bus bar, and voltage sensing member 300 are combined via a laser welding method, the battery module 10 of the present disclosure may consume less manufacturing costs because the bus bar is omitted and the clinching method that is relatively inexpensive is applied.

Meanwhile, a battery pack according to the present disclosure may include one or more battery modules according to the present disclosure. Also, the battery pack according to the present disclosure may further include, in addition to the battery module, a pack case for accommodating the battery module, various devices for controlling charging and discharging of each battery module, for example, a master BMS, a current sensor, a fuse, and the like.

The battery module according to the present disclosure may be applied to a vehicle, such as an electric vehicle or a hybrid vehicle. In other words, the vehicle may include the battery module according to the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, terms used to indicate directions such as up, down, left, and right are used in the present specification, but these terms are merely for convenience of description and it would be obvious to one of ordinary skill in the art that the terms may vary depending on a location of a target object or a location of an observer.

What is claimed is:

1. A battery module comprising:
   a cell stack having battery cells stacked in a first direction and at least one lead overlapping portion formed by overlapping electrode leads of the battery cells;
   a voltage sensing member having at least one sensing part directly connected to the at least one lead overlapping portion; and
   a lead holding member having a first holding bar coupled to a front portion of a support frame so that a connection portion of the lead overlapping portion and the at least one sensing part is provided between the first holding bar and the support frame, the lead holding member being detachably provided at the support frame,
   wherein the lead holding member comprises:
      a shaft coupled to a lower portion of the support frame via a hinge and connected to the first holding bar; and
      a second holding bar coupled to the shaft and extending in parallel from a location spaced apart from the first holding bar by a predetermined interval,
   wherein each lead overlapping portion and each sensing part are directly combined by clinching.

2. The battery module of claim 1, wherein the clinching groove comprises:
   an edge region concavely formed; and
   a center region convexly formed relative to the edge region.

3. The battery module of claim 1, wherein an electrode lead adapted to directly contact the support frame from among the electrode leads forming the lead overlapping portion comprises a hole sized to be smaller than an inner diameter of the clinching groove.

4. The battery module of claim 1, wherein the support frame comprises at least one latch provided to be combined and locked to the first holding bar.

5. The battery module of claim 1, wherein the voltage sensing member comprises:
   a first main body portion extending in a longitudinal direction of the cell stack at a top portion of the cell stack; and
   a second main body portion extending in a width direction of the cell stack from both end portions of the first main body portion,
   wherein each of the at least one sensing part extends from the second main body portion to contact each of the at least one lead overlapping portion.

6. The battery module of claim 1, wherein the voltage sensing member is formed of a flat flexible cable (FFC) or a flexible printed circuit board (FPCB).

7. A battery pack comprising the battery module according to claim 1.

8. A vehicle comprising the battery pack according to claim 7.

9. A battery module comprising:

a cell stack having battery cells stacked in a first direction and at least one lead overlapping portion formed by overlapping electrode leads of the battery cells;

a voltage sensing member having at least one sensing part directly connected to the at least one lead overlapping portion; and a lead holding member having a first holding bar coupled to the front portion of the support frame so that a connection portion of the lead overlapping portion and the at least one sensing part is provided between the first holding bar and the support frame, the lead holding member being detachably provided at the support frame, the lead holding member comprising:

a shaft coupled to a lower portion of the support frame and connected to the first holding bar; and a second holding bar coupled to the shaft and extending in parallel from a location spaced apart from the first holding bar by a predetermined interval.

10. The battery module of claim 1, wherein the support frame has slits formed every predetermined interval along the first direction of the battery cells, the support frame being disposed at a front portion or rear portion of the cell stack.

11. The battery module of claim 10, wherein each lead overlapping portion is extracted to a front portion of the support frame through each of the slits and arranged to face a surface of the support frame.

12. The battery module of claim 11, wherein the support frame has a clinching groove, and a region of the lead overlapping portion and the sensing portion is press-fitted into the clinching groove.

* * * * *